United States Patent
Luft et al.

(10) Patent No.: US 10,206,102 B2
(45) Date of Patent: *Feb. 12, 2019

(54) NETWORK ACCESS CONTROL METHODS AND APPARATUS

(71) Applicant: APPLE INC., Cupertino, CA (US)

(72) Inventors: Achim Luft, Braunschweig (DE); Maik Bienas, Braunschweig (DE); Hyung-Nam Choi, Hamburg (DE); Martin Hans, Bad Salzdetfurth (DE)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/142,192

(22) Filed: Apr. 29, 2016

(65) Prior Publication Data

US 2016/0249217 A1 Aug. 25, 2016

Related U.S. Application Data

(63) Continuation of application No. 14/629,172, filed on Feb. 23, 2015, now Pat. No. 9,332,436, which is a
(Continued)

(51) Int. Cl.
*H04W 12/06* (2009.01)
*H04W 36/32* (2009.01)
(Continued)

(52) U.S. Cl.
CPC ........ *H04W 12/06* (2013.01); *G06Q 30/0205* (2013.01); *H04L 63/0853* (2013.01);
(Continued)

(58) Field of Classification Search
CPC ... H04W 84/12; H04W 92/02; H04W 84/045; H04W 88/06; H04W 88/16; H04W 12/08;
(Continued)

(56) References Cited

U.S. PATENT DOCUMENTS

| | | | |
|---|---|---|---|
| 2008/0076425 A1* | 3/2008 | Khetawat | H04W 88/12 455/436 |
| 2008/0076454 A1* | 3/2008 | Yeh | H04W 48/18 455/466 |

(Continued)

*Primary Examiner* — Fred Casca
(74) *Attorney, Agent, or Firm* — Fay Kaplun & Marcin, LLP

(57) ABSTRACT

Methods and apparatus that provide user access control within wireless networks such as those having both fixed and portable nodes. In one embodiment, the network comprises a 3G cellular network or Interworking WLAN (iWLAN), and the portable nodes comprise Home Node B (HNB) base stations. The HNB is configured to authenticate new users, and provide network access while still maintaining user privacy. The portable nodes also may operate in a number of different operating modes which provide different functional control over user access. In one variant, an easy-to-use owner-assigned ID based access control mechanism with a reliable unambiguous user ID is utilized. Methods for providing access control across differing network architectures and protocols, such the aforementioned iWLAN, and business methods, are also described.

14 Claims, 8 Drawing Sheets

Related U.S. Application Data continuation of application No. 12/157,371, filed on Jun. 9, 2008, now Pat. No. 8,965,338.

(51) Int. Cl.

| | |
|---|---|
| *H04W 36/12* | (2009.01) |
| *H04W 36/06* | (2009.01) |
| *H04W 36/04* | (2009.01) |
| *H04W 84/12* | (2009.01) |
| *H04W 16/32* | (2009.01) |
| *G06Q 30/02* | (2012.01) |
| *H04L 29/06* | (2006.01) |
| *H04W 12/08* | (2009.01) |
| *H04W 8/18* | (2009.01) |
| *H04W 76/11* | (2018.01) |
| *H04W 84/18* | (2009.01) |
| *H04W 84/04* | (2009.01) |

(52) U.S. Cl.
CPC ......... *H04L 63/0876* (2013.01); *H04W 8/183* (2013.01); *H04W 12/08* (2013.01); *H04W 16/32* (2013.01); *H04W 36/04* (2013.01); *H04W 36/06* (2013.01); *H04W 36/12* (2013.01); *H04W 36/32* (2013.01); *H04W 76/11* (2018.02); *H04W 84/12* (2013.01); *H04L 63/162* (2013.01); *H04W 84/045* (2013.01); *H04W 84/18* (2013.01)

(58) Field of Classification Search
CPC ..... H04W 36/14; H04W 12/06; H04W 80/04; H04W 76/022; H04W 84/042; H04W 40/20; H04W 48/18; H04W 74/00; H04W 88/08
USPC ......... 455/436, 466, 435.2, 410, 414.1, 433, 455/435.1, 453, 456.1, 552.1; 370/338, 370/331, 329, 352; 709/224
See application file for complete search history.

(56) References Cited

U.S. PATENT DOCUMENTS

| | | | | |
|---|---|---|---|---|
| 2008/0081620 | A1* | 4/2008 | Lu | H04W 64/00 455/435.1 |
| 2008/0244148 | A1* | 10/2008 | Nix, Jr. | H04L 41/0856 710/313 |
| 2008/0318550 | A1* | 12/2008 | DeAtley | H04L 63/08 455/411 |
| 2009/0046665 | A1* | 2/2009 | Robson | H04W 36/04 370/332 |
| 2010/0238799 | A1* | 9/2010 | Sebire | H04M 15/8038 370/225 |
| 2012/0142314 | A1* | 6/2012 | Mohammed | H04L 63/0428 455/411 |

* cited by examiner

NETWORK ACCESS CONTROL METHODS AND APPARATUS

RELATED APPLICATIONS

This application is related to co-owned and co-pending U.S. patent application Ser. No. 12/156,101 filed May 28, 2008 and entitled "WIRELESS FEMTOCELL SETUP METHODS AND APPARATUS", which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication and data networks and more particularly, in one exemplary aspect, to the implementation of third party in wireless communication and data networks which provides a third party operator with the ability to enable and disable user access to a network while protecting privacy rights of the users.

2. Description of Related Technology

Universal Mobile Telecommunications System (UMTS) is an exemplary implementation of a "third-generation" or "3G" cellular telephone technology. The UMTS standard is specified by a collaborative body referred to as the $3^{rd}$ Generation Partnership Project (3GPP). The 3GPP has adopted UMTS as a 3G cellular radio system targeted for inter alia European markets, in response to requirements set forth by the International Telecommunications Union (ITU). The ITU standardizes and regulates international radio and telecommunications. Enhancements to UMTS will support future evolution to fourth generation (4G) technology.

UMTS networks are separated into three (3) distinct sub-systems, the User Equipment (UE), the Access Network (AN), and the Core Network (CN). The UE (e.g., mobile device or cellular phone) is used by the subscriber to access the network, and is considered the origination point of radio access. The Access Network is comprised of two entities: the Base Transceiver Station (BTS) also referred to as a NodeB, and the Base Station Controller (BSC) also referred to as a Radio Network Controller (RNC). The Access Network can be more generally characterized as the endpoint of radio access. The Access Network interfaces to the Core Network, which manages network administration, such as mobility management, authentication, authorization, accounting, call control, switching, routing, etc.

At 3GPP (3rd Generation Partnership Project), a study is being conducted to develop concepts for supporting the application of Home NodeBs (HNBs) or "femtocells" for 3G networks; i.e., UMTS based on CDMA and LTE (Long Term Evolution). Femtocell deployment could greatly improve the Access Network coverage, at reasonable cost to the network operator. Furthermore, a HNB femtocell could be deployed as an alternative to WiFi and unlicensed mobile access (UMA). The 3G HNB or femtocell base station enables cellular operators to allow customers to use existing and future standard cellular handsets and other devices.

FIG. 1 illustrates a typical UMTS cellular system 100. The Access Network comprises a plurality of base station towers or NodeBs 102 that are set at fixed geographic locations. Their wireless coverage is indicated by the dotted areas 104. Unlike the NodeBs 102, a HNB (femtocell) 112 is not necessarily geographically fixed and creates overlapping wireless coverage as indicated by the dotted areas 114 of FIG. 1. The Core Network 106 (which is not illustrated in its full complexity) includes a number of different components and logical entities, and governs the operation of the NodeBs 102. It is assumed, that the HNBs 112 may be operating as an UMTS NodeB or Enhanced NodeB (eNodeB) and that the surrounding NodeBs 102 and HNBs 112 are operating as UMTS NodeBs or eNodeBs. A UE 108 is being served by either the NodeB 102 or HNB 112, and can switch between the two servers via a well known handoff procedure.

A considerable capital expenditure for network operators is associated with the deployment of additional fixed base stations. Unlike base stations, femtocells are typically paid for by customers wishing to improve service and or localized reception. Therefore, the intended mode of operation for the HNB femtocell is to augment the service provider's existing network of base stations by connecting to the service provider's network via a broadband interface (such as DSL or DOCSIS cable modem). Due to the smaller size and cost of an HNB femtocell, they can be distributed in areas which are not feasible for service through standard base station deployment (e.g., extension of indoor service coverage, or for temporary service coverage).

With the convergence of WiFi, VoIP and fixed (e.g., circuit-switched PSTN) telephony within the home, mobile operators are also seeking a way to increase their share of the residential calls market. In one approach, a HNB femtocell could support cellular calls locally, and then use a broadband connection to carry traffic to the operator's Core Network. Another distinct advantage of femtocell deployment over other user managed networks (such as WLAN, WiMAX, etc.) is that femtocells offer seamless integration with current cellular network base stations.

The benefits of HNB deployment are shared between the user and the network. From the customer's perspective, a home base station (femtocell) offers the benefit of using a single mobile handset with a built-in personal phonebook for all calls, whether from home or elsewhere. Ideally, client devices (such as a UMTS phone) may transition freely between a HNB and a base station (without pre-stored network configuration) transparently to the user. This feature enables operation with all existing and future handsets, rather than requiring customers to upgrade to expensive dual-mode devices. Flexible usage, low cost, and increased network coverage and capacity for end users are the key benefits for customers seeking to deploy HNB femtocells.

Base station networks are planned and deployed by a network operator; however, femtocell deployment is accomplished by a user, and can be temporary and/or arbitrary in nature, which can create additional implementation problems for network operators. Furthermore, while the HNB femtocell performs similar functions to the Access Network, it is owned and managed by a home operator. None the less, certain functions (e.g. network access, security, authorization, etc.) must remain in control of the Core Network.

Additionally, a desirable implementation for a HNB enables additional user access control capabilities, to allow the home operator to moderate HNB usage. In one example, access to a HNB is allowed for a closed user group only; e.g. employees of a company, or family members within a residence. In another example, access to a HNB could be granted to a UE, pending authorization by the HNB owner.

Next Generation Networking (NGN) is another ongoing ITU topic of research and standardization for system architecture. Next Generation Networking broadly describes requirements for evolution of future communications systems and architectures. The main elements of NGN are: (i) packet-based networking capable of providing telecommunication services; (ii) multiple broadband Quality-of-Service (QoS) enabled transport technologies; and (iii) unrestricted access by users to different service providers. NGN defines "access independence" as a separation between transport technology and Core Network services. The decoupling of NGN Core Network components and procedures from the subtleties of access technology enables a user to employ a single identity across multiple transport technologies, e.g. WLAN, UMTS, etc.

In light of NGN standardization, the 3GPP has active research and development efforts to standardize Release 6 (WLAN/3GPP interworking); Release 6 allows 3GPP terminals to access a 3GPP IP Multimedia Subsystem (IMS) via WLAN. Wireless Local Area Network (WLAN) access is a wireless standard defined by IEEE Std. 802.11 that governs the communication of devices over a 5 GHz and/or 2.4 GHz public spectrum. WLAN is subdivided into Interworking WLAN (iWLAN) and "plain user" WLAN. Plain user WLAN is used to generically describe a privately owned WLAN access point (e.g., an AP at a residence or small business). Interworking WLAN combines a traditional WLAN access point, with additional existing 3GPP Core Network functionality, to offer a single universal user identity between UMTS and WLAN access.

WLAN was originally designed for generic wireless local area networking, and does not require any network infrastructure. WLAN could originally support simple network topologies, including peer-to-peer "ad-hoc" networks. In such simple ad-hoc networks, communication links are established directly from one wireless device, to another, without involving intermediate access points. The iWLAN network infrastructure is correspondingly more complex, as it must incorporate 3GPP Core Network entity access, to support authorization, authentication and access control. The additional complexity of iWLAN networking enables future NGN evolution toward ubiquitous, secure network service for subscribers, via 3GPP IP Access.

Referring to FIG. 2, the exemplary iWLAN network 200 comprises a WLAN UE 202, WLAN Access Network (WLAN AN) 204, 3GPP Authentication, Authorization and Accounting (AAA) Server 206, and a Packet Data Gateway (PDG) 208. The PDG 208 enables WLAN 3GPP IP Access to External IP networks (Packet Switched Services) 210 (pending authorization of the 3GPP AAA server). The WLAN Access Network 204 includes WLAN access points, routers, and intermediate AAA elements. The WLAN User Equipment 202 (WLAN UE) includes all equipment that is in possession of the end user.

Access control in a iWLAN system requires the WLAN UE 202 to authenticate and register with the Core Network via the 3GPP AAA Server 206 to obtain 3GPP IP Access 210. Service authentication and authorization is accomplished using the 3GPP (U) SIM (subscriber identity module) based protocol described hereafter. Unlike the Access Network of a UMTS system, which shares common messaging with the Core Network; the WLAN UE must establish one or more secure tunnels (e.g., VPN) with the 3GPP Network, and access the Core Network entities using TCP-IP protocols (e.g., IPv4, IPv6, etc.).

Similar to HNBs, WLAN APs (Access Points) are typically purchased for residential or business usage, and are administered by the owner. Due to the structural similarity of Release 6 to the Access Network/Core Network of UMTS, additional user access control capabilities which allow the iWLAN home operator to moderate usage are desirable. Furthermore, the access independence of iWLAN ensures that similar modifications to access control methods for 3G cellular systems, can also be used for iWLAN networks.

Prior Art Access Control

In the exemplary context of 3G cellular networks, access control has been based on an authentication protocol called Authentication and Key Agreement (AKA). AKA is a challenge-response based mechanism that uses symmetric cryptography. IN the UMTS implementation of AKA, the user equipment (UE) must first identify itself before the Core Network can initiate the challenge-response; the Core Network will then initiate a challenge process to the UMTS Subscriber Identity Module (USIM), which is preprogrammed with the AKA response protocol.

The USIM application is resident to the UE, and it comprises the hardware and software apparatus required to unambiguously and securely identify the user to the network. The USIM application resides on a smart card that can be inserted or removed from the mobile device and contains, inter alia, the permanent identity of the user, called the International Mobile Subscriber Identity (IMSI), and a shared secret key (used for authentication). The smart card is generally referred to as the UMTS Integrated Circuit Card (UICC). The USIM on the UICC card is provided by the service provider; hence even if the UICC card is moved from one UE to another, the service provider and service configuration remain the same. The importance of the IMSI identification to user privacy imposes specific protection measures, such that the subscriber identity is masked whenever possible.

Unlike other UTRAN fixtures, a HNB is not completely controlled by the network operator. The typical operators of HNBs are residential and small business owners who wish to augment their current wireless area network service. In order to maintain a consistent level of security across the network, network operators require that HNBs support the same standard of service as a NodeB. Therefore, due to the non-technical nature of the HNB operator, a design constraint on the usability of the user interface (e.g., does not require technical knowledge, does not require undue effort for administration, etc.) for access control is required. Furthermore, as mentioned before, the sensitive nature of a UE's permanent identity (i.e. IMSI) must be shielded from the owner of the HNB, to protect the privacy of the user.

An exemplary LTE authentication and security setup procedure is shown in FIG. 3. UMTS network control messaging can be divided into Access Stratum (AS) and Non-Access Stratum (NAS). AS refers generally to the lower-level network functions which comprise data carrying capacity, and radio resource control; AS functions include but are not limited to Media Access Control (MAC), Radio Link Control (RLC), Broadcast, Multicast Control (BMC), and Radio Resource Control (RRC). NAS refer generally to higher-level network functions, including but not limited to: Call Control (CC), Session Management (SM), Supplementary Service (SS), Short Messaging Service (SMS), Mobility Management (MM), etc. Core Network services such as authentication and registration are handled in NAS messaging; Access Network services and messaging are categorized as AS messaging.

Referring to the sequence of steps 300 of FIG. 3, the UE requests access using a non-access stratum (NAS) message 302, comprising the IMSI/TMSI, a Key Set Identifier (KSI), and UE capabilities is forwarded to the Mobility Management Entity (MME) via the NodeB 304 (the NodeB does not process the message). The MME identifies the user with the use of the encrypted IMSI/TMSI. Under certain conditions, (e.g., if the user has not been authenticated), the MME will require an authentication and key agreement (AKA) to complete successfully 306.

After the UE and MME have completed the AKA, and mutual authentication has completed, the MME updates the Home Location Register (HLR), and initiates local security activation procedures. The MME selects UMTS encryption algorithms (UEA), UMTS integrity algorithms (UIA), and generates a series of encryption keys. In step 308, the MME sends a Security Mode Command (SMC) to the NodeB comprising the selected UEA, UE capabilities, KSI, and a NAS Message Authentication Code (MAC) the NodeB forwards the NAS SMC to the UE 310, and an acknowledgement to the MME 312. After the UE has completed NAS-MAC verification, and initialized security integrity and encryptions procedures, the UE completes NAS SMC signaling with the MME 314, and local security procedures are completed.

Once local security procedures have correctly finished, the UE and NodeB must complete Access Stratum setup. After the AS SMC has completed, the UE and NodeB can initiate data and call control, normal call initiation and call processing safely and securely.

Referring now to steps 302, 304, and 306, a key security/privacy risk is the transfer of the International Mobile Subscriber Identity. The IMSI consists of Mobile Country Code (MCC), a Mobile Network Code (MNC), and a Mobile Subscriber Identification Number (MSIN). The total maximum length of IMSI is fifteen (15) digits, where the MCC is three (3) digits and MNC is typically two or three (2 or 3) digits depending on the area. From a subscriber's privacy point of view, the MSIN uniquely identifies the subscriber and thus must be protected for confidentiality reasons. Unfortunately, the subscriber's credentials cannot be fetched before the subscriber has been properly identified. With the 3G AKA authentication method the network cannot be authenticated (from the UE's point of view) before the UE has provided its own identification. Furthermore, because the UE must transmit its IMSI across the air interface, the UE must be able to reject plain text IMSI queries coming from an untrustworthy source. Additionally, public key cryptography or symmetric keys may be used to hide the IMSI.

Securing the IMSI over the air interfaces can be achieved if the UE has a public key (or symmetric key), which it can use to encrypt (at least the MSIN of) the IMSI before sending it to the network. In a public key based approach, the UE uses a public key of the operator to encrypt the IMSI for secure transmission over the air. Only the originator of the public key may decrypt the message, and corresponding IMSI.

Another alternative to IMSI, a temporary identity called TMSI is used in UMTS, if the subscriber is already known in the network. TMSI is allocated by network immediately after AKA, and is used thereafter for UE identification. The TMSI is a randomly allocated number that is only local to a geographic area. Furthermore, the network frequently changes the TMSI at arbitrary intervals in order to avoid the subscriber from being identified and tracked by eavesdroppers on the radio interface. While TMSI provides additional privacy to a user, as mentioned above, the TMSI may only be granted after the IMSI has initially passed the AKA correctly. Therefore, even though the TMSI can minimize IMSI exposure after AKA, since the IMSI is the unique identifier for the UE it is vulnerable during the initial AKA.

Unlike traditional NodeBs which do not implement access control locally (access control is done at the Core Network), HNBs implement an additional level of access control. A public key encrypted IMSI cannot be used by the HNB to identify a user (it is encrypted). The TMSI is also unsatisfactory, as it is a temporary identifier and is changed arbitrarily, and frequently. HNB access control requires the UE's IMSI, but must be implemented in a manner which minimizes UE plaintext IMSI transfers.

Other Prior Art Approaches

Various other approaches to network access control are evidenced in the prior art. For example, U.S. Pat. No. 5,444,764 to Galecki issued Aug. 22, 1995 entitled "Method of providing a subscription lock to a radiotelephone system" discloses a radiotelephone system which includes a radiotelephone having a subscription lock and a removable subscriber identification module (SIM) card containing an international mobile subscriber identification (IMSI). The subscriber lock is used to restrict registration into the radiotelephone system to only those radiotelephones which contain a SIM card which has an IMSI which falls within a range of valid IMSIs programmed into the radiotelephone or the user has entered a subsidy flag personal identification number (PIN) for permanently disabling the need for a valid IMSI.

WIPO Publication No. WO1998015154 to Karapetkov et al. published Sep. 4, 1998 entitled "Process for controlling access for a communication terminal" discloses a process for controlling access for a communication terminal which is registered with different identities in two mobile networks operating with two different technologies. According to the invention, when an attempt is made to access one of the mobile networks, a check is made to see whether the communication terminal has access authorization for that particular mobile network, and also whether the communication terminal has the identity necessary to access the other mobile network. According to the invention, when an attempt is made to access one of the mobile networks, a check is made to see whether the communication terminal has access authorization for that particular mobile network, and also whether the communication terminal has the necessary identity to access the other mobile network. If this identity is not contained in the communication terminal, access for incoming or for incoming and outgoing calls is denied. If this identity is not contained in the communication terminal, access for incoming or for incoming and outgoing calls is denied.

U.S. Pat. No. 5,940,773 to Barvesten issued Aug. 17, 1999 entitled "Access controlled terminal and method for rendering communication services" discloses an arrangement for rendering services such as for example telephone communication, data communication and so on comprising a terminal unit and an access unit, the terminal unit comprising a terminal-unit-identification code which is stored in the terminal unit and the access unit comprising a first access identification code, terminal unit as well as an access unit being lockable. In the terminal unit are furthermore first access identification codes for a given number of access units stored wherein upon starting up of the device involving contact between terminal unit and actual access unit with a certain access unit identification code, identification code of the access unit is compared to in the terminal unit stored first access identification code(s) in the terminal unit, correspondence between stored access identification code and actual access unit identification code leading to locking up of the terminal unit whereas non-correspondence between stored and actual access unit identification codes respectively at least the terminal unit identification code must be given.

United States Patent Publication No. 20050164738 to Liu published Jul. 28, 2005 entitled "Systems and methods for securing personal or private content stored in the internal memory of a mobile terminal" discloses mobile terminals, such as cell phones, having an internal memory and operating in a GSM wireless network environment with a SIM, store private content such as images, ring tones, buddy lists, email and the like, in the terminal memory. The private content is associated with the IMSI/MSISDN information of the content owner. The terminal correlates the IMSI/MSISDN information of the SIM with the IMSI/MSISDN information of the private content to grant access to the content only upon a positive content/SIM correlation.

United States Patent Publication No. 20070008885 to Bonner published Jan. 11, 2007 entitled "Dynamic dual-mode service access control, location-based billing, and E911 mechanisms" discloses an architecture that facilitates the validation and authentication of the physical location of the dual-mode handset in a VoWLAN solution (e.g., UMA (Unlicensed Mobile Access)) system and a cellular wireless service, thereby restricting the handset from gaining access from unauthorized locations. Thus, access to dual-mode service (e.g., UMA), for example, at a particular location (e.g., in a subscriber's home, or in a hot spot that is controlled by carrier) can now be managed to allow or deny service at a certain location. Another aspect of the invention is the capability to perform location-based billing. For example, if the subscriber is at home, the call may be free. Alternatively, if the subscriber is at a remote location (e.g., a retail establishment), it is now possible to charge for that connection at a different fee. Additionally, a location can now be assigned; for example, to assign a location for E911 compliance.

United States Patent Publication No. 20070096869 to Trohler published May 3, 2007 entitled, "Work time recording system and method for recording work time" discloses a method and a system for work time recording in which a data recording client records biometric data and/or data on physical condition of the user, and transmits it together with the user data over a first communication channel to the central unit. The user is identified based on the transmitted biometric data and/or data on physical condition and biometric data and/or data on physical condition of users stored in the user database. The analyzed data are transmitted to a remuneration recording module, and are evaluated and/or checked by means of the remuneration recording module.

WIPO Publication No. WO2007076147 to Linkola published May 7, 2007 entitled "System and method for limiting access to an IP-based wireless telecommunications network based on access point IP address and/or MAC address" discloses a system and method which manages call connections between mobile subscribers and an EP-based wireless telecommunications network through a wireless access point. Communications between the mobile subscribers and the IP-based wireless telecommunications network are initiated by a registration request. During the registration request various identifiers (IMSI, MAC address, IP Address, etc.) are communicated to the system. The system is arranged to log the identifiers and associate those identifiers with the entry point (e.g., the wireless access point) into the IP based wireless network. Call connections from the mobile subscribers are monitored for various throughput and call quality based metrics. Call handoffs between the IP-based wireless communications network and the cellular telephony network are managed by the system based on the monitored call quality and throughput metrics on a per-access point basis using the registered identifiers.

Korean Patent Publication No. KR 10-20060017142 entitled "Terminal identification method for interworking between a portable internet network and the other network, capable of identifying the terminal through a consistent method with an existing network by mapping an MAC address" published Feb. 23, 2006 discloses the mapping of a MAC (medium access control) address in IMSI type to generate an IMSI number. Another network identifies the terminal by using the generated IMSI number. Despite the foregoing various approaches to network access control, improved methods and apparatus are needed to address the various drawbacks and shortcomings present in these prior art solutions for providing access control, and issues related to inter alia security and authentication procedures, especially as they apply to an HNB. These issues include the protection of subscriber identity specific information from the third party operator, which also needs to be kept confidential from the provider of the HNB.

Specifically, the HNB requires the IMSI of the user for consistent access control. However, it is possible that with knowledge of a user's IMSI, the user's location could be tracked. Furthermore, because the IMSI is unique and static to each user, using IMSI data collected in the past, a user's history could be tracked. Therefore the owner/operator of a HNB should preferably be not made aware of the user's IMSI (MSIN) in order to ensure the user's privacy and confidentiality when the user is not using the HNB.

Second, confidential IMSI protection in wireless networks is currently evolving, and future modifications to IMSI protection and processes are inevitable. Therefore, any future confidential protection mechanisms should take into account future privacy concerns so that in the future, current access control schemes do not cause future IMSI based HNB access control schemes to fail.

Third, the IMSI is a unique user ID for the network, but it is not intuitive to handle for a HNB owner. It is unlikely that the HNB owner would recognize a user requesting access based on their unique 15 digit IMSI. Nor is it likely that the HNB owner would be able to keep track of IMSIs for managing access control. Unfortunately, there are no other such reliable User IDs to be used for access control in current mobile networks. Accordingly, a simplified User ID for use in HNB is desirable.

Additionally, such improved methods and apparatus for providing access control with a closed user group would enable access control that can easily be performed by the owner of a HNB, without neglecting privacy issues of the users attempting to gain access to the closed user group.

Further, such methods and apparatus would ultimately provide a simple control and management scheme for a non-technical operator using an apparatus providing network accessibility, allowing for the creation and or management of a group of users, as well as adding and/or removing users to/from a group, and authentication of the served users to the existing network infrastructure while complying with the network operator's requirements for user security.

In addition, such improved methods and apparatus would have broad application beyond the scope of just the HNB, as well as applicability in other network architectures such as, for example, user authentication and registration with a third-party owned WLAN hotspot.

Such improved methods and apparatus would also preferably provide access appropriately in emergency situations, such as for example permitting a user who is blocked in a closed user group iWLAN area to establish an emergency call. With current access control methods e.g., 802.1x or MAC filtering, even the first hop (over the air) would be denied before the terminal is able to signal that it wants to establish an emergency call. Such an access control scheme may be prohibited by law for semipublic usage if non-authenticated users were prevented from making calls in emergency situations.

SUMMARY OF THE INVENTION

The present invention satisfies the foregoing needs by providing, inter alia, improved methods and apparatus for providing network access in a wireless (e.g., cellular) network.

In a first aspect of the invention, a method of providing network access to a user via a femtocell of the network. In one embodiment, the method comprises: providing a temporary identification to the femtocell, the temporary identification being associated with the user; authenticating the user to a core network via the femtocell using at least the temporary identifier; transferring identity information associated with the user to the femtocell after the authentication of the user, wherein the user identity information is previously known to the core network; and granting access of the femtocell to the user. An operator of the femtocell is unable to access the identity information.

In one variant, the femtocell comprises three operating modes, the operating modes comprising: (1) an open-access operating mode; (2) a closed operating mode; and (3) a query-based operating mode.

In another variant, the method further comprises assigning an operator-generated identity to the user; wherein the operator-generated identity is associated with the identity information by the femtocell. The operator-generated identity is not created if the femtocell is in a closed operating mode, the closed operating mode preventing unknown users from gaining access to the femtocell.

In a further variant, the method further comprises automatically prompting the operator to assign the operator-generated identity to the user if the user is unknown to the femtocell.

In yet another variant, the operator-generated identity comprises human-cognizable data which facilitates the recognition of the user to the operator.

In still another variant, the acts of authenticating and transferring are performed over a wired network interface selected from the group consisting of: (i) a DSL interface; (ii) a cable modem; and (iii) a T1 Line. The acts of providing and granting access are performed over a wireless network interface.

In a second aspect of the invention, a communications apparatus is disclosed. In one embodiment, the apparatus comprises: a processing subsystem; a broadband connection subsystem; a wireless modem subsystem; and a memory subsystem comprising a plurality of computer-executable instructions that when executed by the processing subsystem: receive via the wireless modem subsystem a temporary identification of a client device; forward via the broadband connection subsystem the temporary identification to a network entity; receive via the broadband connection subsystem user identity information associated with the client device; and associate the user identity information with an operator-selected identification.

In one variant, the communications apparatus comprises a 3G femtocell, the wireless modem subsystem comprises a cellular air interface, and the network entity comprises a Core Network portion entity.

In another variant, the apparatus further comprises instructions that when executed by the processing subsystem: prompt an operator of the apparatus to select an operating mode; receive via an I/O (input/output) apparatus the selected operating mode;

and operates the femtocell apparatus according to the selected operating mode. The operating mode comprises e.g., at least one of three operating modes, the three operating modes comprising: (1) an open operating mode; (2) a closed operating mode; and (3) a query-based operating mode.

In a further variant, the acts of forwarding, receiving and associating are not performed if the communications apparatus is operated in the closed operating mode.

In yet another variant, the apparatus further comprises an I/O (input/output) apparatus. The operator-selected identification is created by an operator of the communications apparatus via the I/O apparatus. The user identity information is not accessible to the operator, thereby providing confidentiality to at least the identity of the client device or its user.

In still another variant, the apparatus further comprises a base transceiver station (BTS) modem subsystem, the BTS modem subsystem in operative communication with a cellular network, and the broadband connection subsystem comprises for example a digital subscriber line (DSL) modem.

In a third aspect of the invention, a networked system is disclosed. In one embodiment, the system comprises: a client device; a femtocell apparatus; and a core network. The client device comprises a temporary client device identity known to the core network; and the femtocell apparatus is able to authenticate the client device to the core network and subsequently receive a private client device identity without transmitting the private client device identity over a wireless network interface.

In one variant, the system further comprises a base station transceiver, the base station transceiver transmitting the temporary client device identity to the client device via a wireless network interface.

In another variant, the core network comprises a mobility management entity (MME) and a home location register (HLR). The MME and HLR facilitate the authentication of the client device to the femtocell apparatus.

In a fourth aspect of the invention, computer readable apparatus is disclosed. In one embodiment, the apparatus includes a storage medium comprising a plurality of computer-executable instructions that, when executed by a computer, perform the method comprising: receiving via a wireless interface a temporary identification of a client device; forwarding via a broadband interface the temporary identification to a network entity; receiving via the broadband interface user identity information associated with the client device; and associating the user identity information with an operator-selected identification.

In one variant, the computer readable apparatus comprises a hard disk drive (HDD) disposed on a femtocell communications apparatus within a 3G cellular network.

In a fifth aspect of the invention, a method of operating a communications apparatus within a wireless network is disclosed. In one embodiment, the apparatus comprising a first communications interface and a wireless interface, the method comprising: receiving via the wireless interface a temporary identification of a client device; forwarding via the first interface the temporary identification to a network entity associated with the wireless network; receiving via the first interface user-specific identity information associated with the client device; and associating the user-specific identity information with an operator-selected identification.

In a sixth aspect of the invention, a method of doing business within a wireless network is disclosed. In one embodiment, the network has a service provider operating a core portion of the network, and at least one subscriber of the network, and the method comprises: providing the at least one subscriber with a femtocell apparatus adapted to provide wireless interface to a plurality of users, some of the users not being subscribers of the wireless network; disposing the femtocell apparatus at the at least one user's premises; operatively coupling the femtocell apparatus to the core portion via a communications interface; and selectively operating the femtocell apparatus at least partly under control of the service provider, the selective operation by the service provider comprising evaluating use of the femtocell apparatus by at least one of the users that are not subscribers based on at least one profitability or revenue generation consideration.

In one variant, the wireless network comprises a 3G cellular network, the communications interface comprises an interface operated by a service provider other than that of the cellular network, and the method further comprises the service provider of the communications interface providing at least one operational preference to the at least one subscriber in consideration of at least one preference being provided by the service provider of the cellular network.

In a seventh aspect of the invention, a user access control architecture for use in a wireless network is disclosed. In one embodiment, the architecture comprises: femtocell apparatus comprising a database, the database comprising a logical relationship between an internally stored unique identifier of a user of the network and an owner-assigned ID for the user; and apparatus adapted to receive a temporary identification from the at least one user, the temporary identification being only locally unique. Use of the temporary identification and the internal storage of the unique identifier ensures that no plain transmission of the unique identifier over an air interface of the wireless network is required for network operation.

In one variant, the network comprises a 3G cellular network, and the unique identifier comprises an International Mobile Subscriber Identity (IMSI), and the temporary identification comprises a Temporary Mobile Subscriber Identification (TMSI).

Other features and advantages of the present invention will immediately be recognized by persons of ordinary skill in the art with reference to the attached drawings and detailed description of exemplary embodiments as given below.

DETAILED DESCRIPTION OF THE INVENTION

Figure 1:
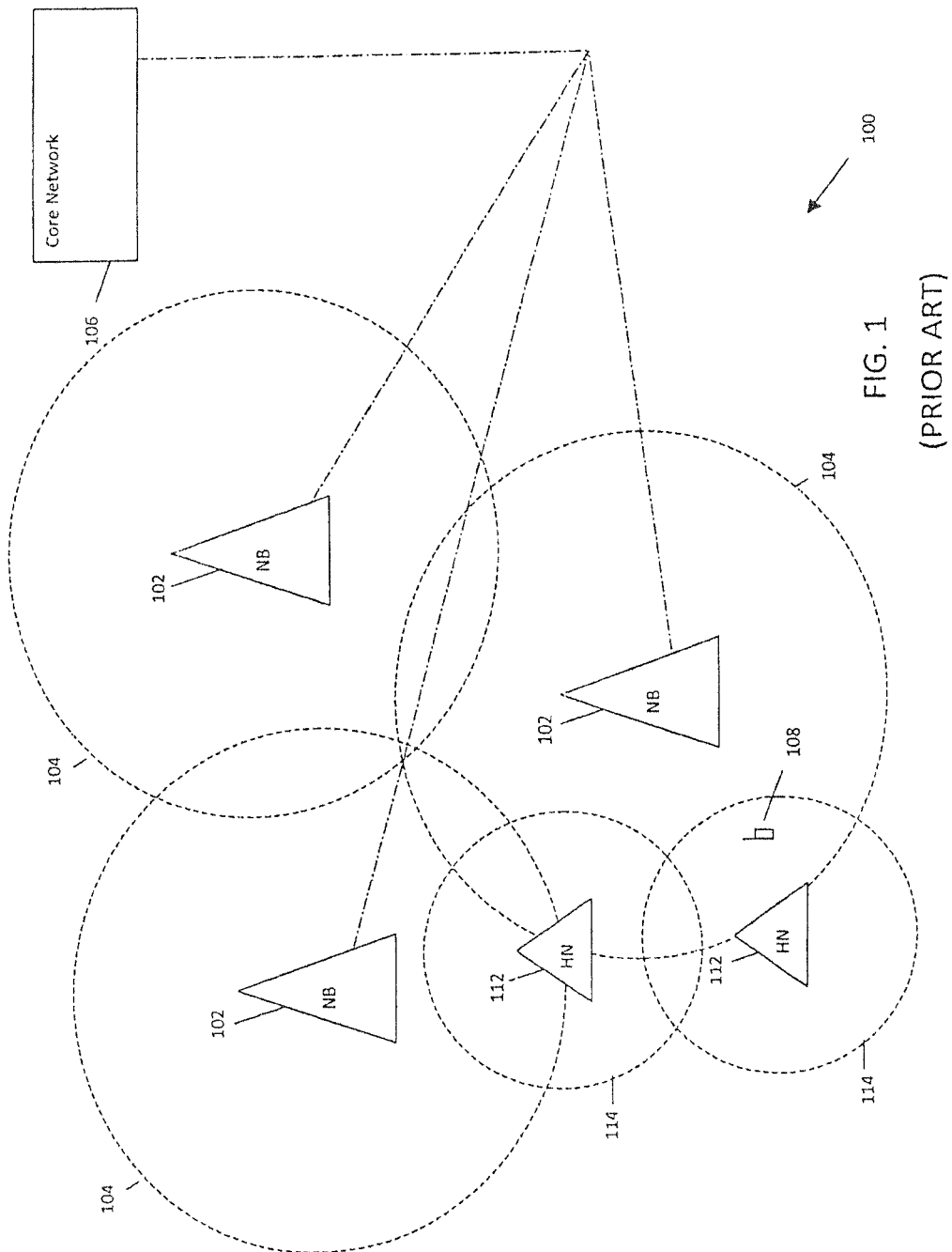
FIG. 1 is a block diagram illustrating a typical prior art UMTS cellular network architecture.
Figure 2:
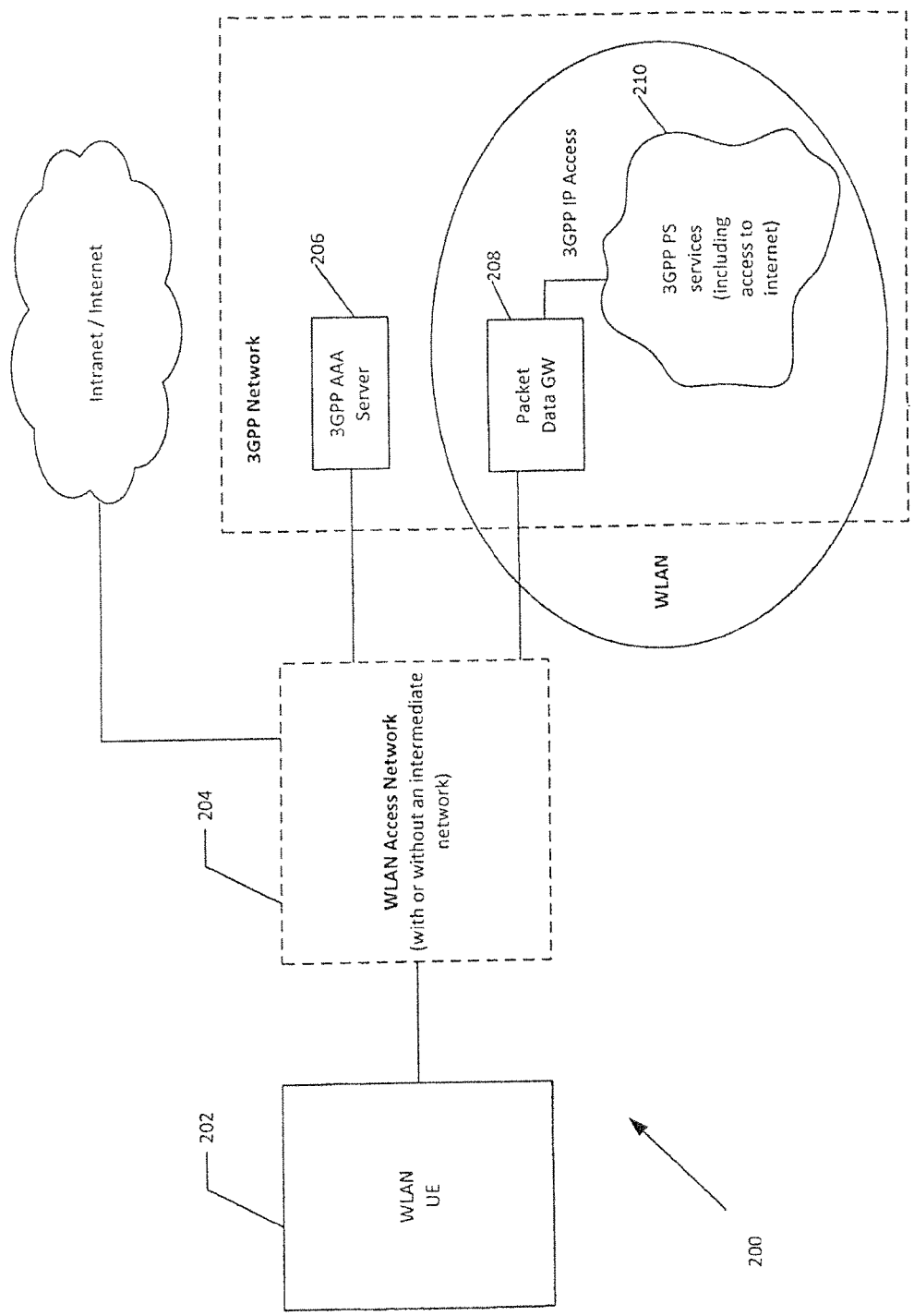
FIG. 2 is a block diagram illustrating a typical prior art interworking WLAN (iWLAN) network architecture.
Figure 3:
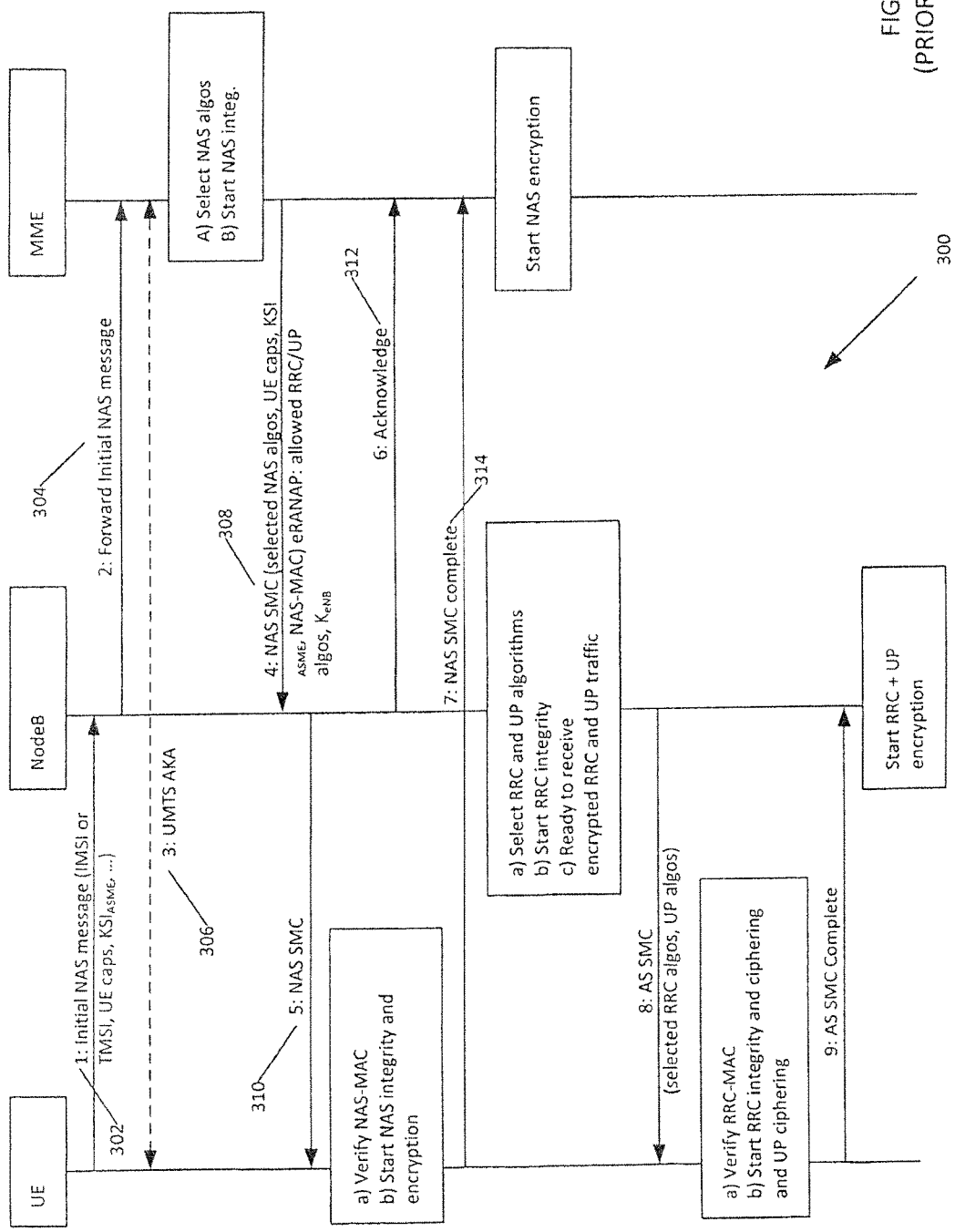
FIG. 3 is a graphical illustration of a typical prior art LTE authentication and security setup procedure.

As used herein, the term "access level" refers to, without limitation, one or more levels of varying user access to services or privileges on a network or device. For instance, a simple multi-level user access scheme might comprise "access" or "no access". Another example might be "no access", "partial access", or "full access". Yet another scheme might comprise different authorizations or security levels, such as "unsecure access", "secure (encrypted) access", "secure (encrypted and integrity-protected) access", and so forth. These access schemes may be applied on a per-user and/or per-service basis, a per-network basis, or according to yet other approaches.

As used herein, the terms "client device", "end user device" and "UE" include, but are not limited to, personal computers (PCs), such as for example an iMac™, Mac Pro™, Mac Mini™ or MacBook™, and minicomputers, whether desktop, laptop, or otherwise, as well as mobile devices such as handheld computers, such as for example an iPhone™, PDAs, video cameras, set-top boxes, personal media devices (PMDs), such as for example an iPod™, or any combinations of the foregoing.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

As used herein, the term "digital subscriber line" (or "DSL") shall mean any form of DSL configuration or service, whether symmetric or otherwise, including without limitation so-called "G.lite" ADSL (e.g., compliant with ITU G.992.2), RADSL: (rate adaptive DSL), VDSL (very high bit rate DSL), SDSL (symmetric DSL), SHDSL or super-high bit-rate DSL, also known as G.shds1 (e.g., compliant with ITU Recommendation G.991.2, approved by the ITU-T February 2001), HDSL: (high data rate DSL), HDSL2: (2nd generation HDSL), and IDSL (integrated services digital network DSL), as well as In-Premises Phoneline Networks (e.g., HPN).

As used herein, the term "DOCSIS" refers to any of the existing or planned variants of the Data Over Cable Services Interface Specification, including for example DOCSIS versions 1.0, 1.1, 2.0 and 3.0.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "network" and "bearer network" refer generally to any type of data, telecommunications or other network including, without limitation, data networks (including MANs, PANs, WANs, LANs, WLANs, micronets, piconets, internets, and intranets), hybrid fiber coax (HFC) networks, satellite networks, cellular networks, and telco networks. Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, 802.11, ATM, X.25, Frame Relay, 3GPP, 3GPP2, WAP, SIP, UDP, FTP, RTP/RTCP, H.323, etc.).

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), or IrDA families.

As used herein, the term "user interface" refers to, without limitation, any visual, graphical, tactile, audible, sensory, or other means of providing information to and/or receiving information from a user or other entity.

As used herein, the term "WiFi" refers to, without limitation, any of the variants of IEEE-Std. 802.11 or related standards including 802.11 a/b/e/g/n.

As used herein, the term "wireless" means any wireless signal, data, communication, or other interface including without limitation Wi-Fi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

The present invention provides, inter alia, methods and apparatus that enable a femtocell or other access point within a wireless network to authenticate new users, and provide network access while still maintaining user privacy. In one embodiment, the femtocell comprises a 3G HNB which includes a link between an internally stored International Mobile Subscriber Identity (IMSI) and an owner-assigned ID. The IMSI is an unambiguous user ID for each service subscriber, and the owner-given ID is used by the HNB operator to manage network access. The internal storage of IMSI ensures that no plain transmission of IMSI over the air interface is required for network operation. More specifically, in the exemplary embodiment the UE transmits its Temporary Mobile Subscriber Identification (TMSI) over the air to the HNB, and the HNB allows the UE to authenticate itself with the Core Network. The Core Network then updates the HNB with the IMSI via a wired network interface. In this manner, only the TMSI (which is not transmitted in plain text) is exposed across the air interface.

In one embodiment, the HNB stores an internal list of known users, along with their access privileges. After authenticating the UE with the Core Network, the HNB queries the HNB operator as to whether access should be granted or denied. The HNB also requests, in one embodiment, the creation of an owner-given access level. An owner-given ID may also be requested. In future access attempts, the HNB utilizes the unambiguous user ID (e.g. IMSI), which is stored internal to the HNB, to reference an access level for future access attempts. Alternatively, the unambiguous user ID is used to reference the HNB owner given ID for future modification of granted access levels.

The HNB also may operate in a number of differing operating modes. For example, if the HNB operator is queried for every unknown UE request, nearby UEs may unintentionally (or even maliciously—e.g. parasitically, denial-of-service, etc.) request access from the HNB, which may be undesirable. In a first "closed mode", unknown users are always blocked from being able to access HNB and access is automatically denied. In a second "query mode" or "normal mode", unknown users are not allowed to access the HNB without the operator's permission. In an "open mode" or "public mode", no additional access control is performed by the HNB at all, rather only network authentication is performed. Access is granted to every unknown user in this operating mode.

The present invention further contemplates both an "owner-given" and "user-given" ID based access control mechanism with reliable unambiguous user ID (e.g. IMSI). As previously discussed, the unambiguous user ID is necessarily a unique identifier, but it is not recognizably tied to the user it identifies; therefore, the HNB operator can create a recognizable identifier (e.g., owner-given ID) and the HNB operator can query and modify access privileges using the owner-given ID, which is associated internally with the unambiguous user ID. The "hidden" unambiguous user ID may only be accessed through the owner-given ID, by the HNB operator.

The user-given ID facilitates the addition of unknown users that could otherwise be confusing (in that multiple unknown UE entities could request access to the HNB simultaneously). This user-given ID, transmitted in plaintext across the air aids the HNB operator in access control.

Alternatively, the user given ID may be stored within the network, accessible by the MME, and transmitted via broadband access to the HNB.

In another variant of the invention, the femtocell comprises an iWLAN (interworking WLAN) having similar capabilities to those of the aforementioned 3G HNB.

Methods of doing business using the exemplary HNB or iWLAN are also described.

Detailed Description of Exemplary Embodiments

Exemplary embodiments of the present invention are now described in detail. While these embodiments are primarily discussed in the context of access control for HNB operation within a UMTS network, it will be recognized by those of ordinary skill that the present invention is not limited to UMTS, or any particular wireless network. For example, the described authentication method could also be used with other non-3GPP related network access technologies, such as e.g., 3GPP2, WiMAX (IEEE Std, 802.16), or WLAN, For instance, a WLAN network comprises a WLAN access point (e.g., 802.11 "AP") is owned by a third party unrelated to the interworking WLAN. The third party is able to provide service to a user (who must authenticate with the interworking WLAN), while maintaining the security of the served user's network user ID. Access control in the context of iWLAN may be accordingly operated either independently, or in combination with, the UMTS access control schemes of the present invention. Yet other applications will be recognized by those of ordinary skill given the present disclosure.

Methods—

Figure 4:
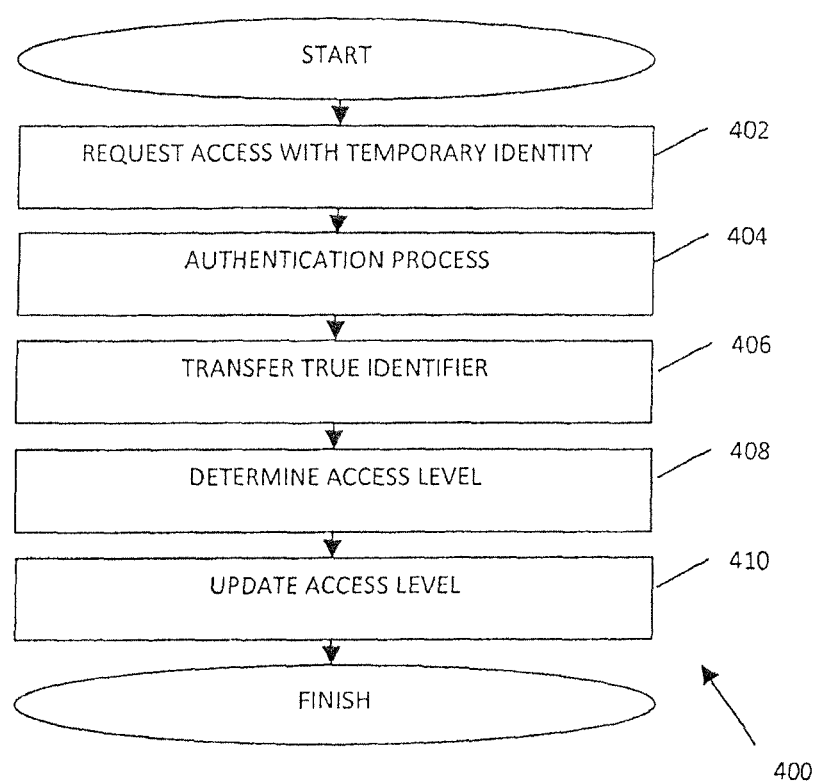
FIG. 4 is a logical flow chart illustrating one embodiment of a generalized network authentication process flow in accordance with the principles of the present invention.

Referring now to FIG. 4, a generalized access control procedure 400 executed in accordance with the principles of the present invention is illustrated. The operative elements as described with respect to the methodology of FIG. 4 are a user device 108 (e.g., UE such as a mobile telephone or laptop computer), a femtocell 112 (e.g., HNB) and a network with an authorization entity (e.g., the Core Network 106). It is first noted that in most applications, prior to starting the access control procedure described in FIG. 4, the user (device) has already authenticated itself to the authorization entity of the network, and has been registered. The user's registration information is stored at a central repository (e.g., home location register or HLR) within the network. This authentication procedure in the context of a 3G network is well known and is accordingly not described further herein.

At step 402, the user requests access from a third-party operated femtocell, and the femtocell receives, by wireless transmission, a temporary network identifier (e.g., TMSI, or encrypted IMSI) from the user. This temporary network identifier is of a format and type that is recognized by the network. Furthermore, this temporary network identifier is encrypted or otherwise masks the true user identity (such as by using a one-way cryptographic hash or the like), to prevent identification thereof.

At step 404, the femtocell allows the user to authenticate to the network. The core network 106 proceeds to authenticate the user via the femtocell. The femtocell operates in effect as a relay or gateway between the network 106 and the user. The user and network must successfully authenticate to one another (mutual authentication) to continue the procedure.

Once the user has authenticated with the network, the femtocell receives the true unique network identifier (e.g. IMSI) for the user at step 406. In this step, the network sends the unencrypted/unmasked unique network identification of the user to the femtocell via a secure wired (or wireless) network interface. As used in the present context, the term "secure" refers to either physical security (e.g., a physically inaccessible or protected means), or virtual security (e.g., encryption, integrity protection, confidentiality, etc. over an untrusted network or link).

At step 408, the femtocell determines if the user should be allowed access. The femtocell has one or more tables or other data structures which comprise a listing of unique identifiers. In one embodiment, the decision to enable access to the user is based on the submitted identifier and the tables of identifiers. In one variant of this embodiment, two tables characterized as "allowed" identifiers and "rejected" identifiers exists. If the user is in the list of allowed users then access is granted. If the user is in the list of rejected users then access is denied.

In another embodiment, if the user is not known yet by the femtocell, the owner is asked to add the new user without providing the user's unambiguous network identification (e.g. IMSI) to the owner. The notification comprises the information that a new user has attempted to connect to the femtocell. In this embodiment, the decision to allow access is predicated upon the femtocell operator's response to a query. In one variant of this embodiment, the femtocell operator is asked to give each new user a new "owner-given ID" for the femtocell. This owner-given ID is recognizable by the femtocell operator, and can comprise for example a meaningful plain text ID and consist of ASCII symbols or XML, such that it could be human readable (e.g., "Peter's handheld", etc.). In another variant, the owner-given ID may comprise a graphic object or icon such as an avatar which may comprise e.g., a picture of a phone, a picture of the UE owner, etc.

In another variant of this step 408 of the method 400, if the user is not known yet by the femtocell, the femtocell retrieves (e.g., from a central database or other repository with which it is in communication) or receives (e.g., via plaintext transfer from the requesting UE) a user-given ID. The notification comprises the information that a new user has attempted to connect to the femtocell, and the user-given ID, to aid in identification of the user.

In another alternative embodiment, the decision to enable access to the user is based on a default operator setting (e.g. never allow access, always allow access). For example, the femtocell could be set in a closed mode where no unknown user is allowed. In this mode, the owner is not asked to add a new unknown user if they try to connect via the femtocell, and access is automatically denied. Alternatively, in an open or public mode, access is granted to every unknown user that becomes authenticated to the Core Network. Yet other schemes or access rules may be employed as well, such as for example open- or closed-access during certain periods of time or under certain operational conditions (e.g., when channel/HNB loading is light, access may be open).

At step 410, the femtocell updates its internal lookup table or tables with the user's unique network identifier, and if available, the femtocell operator's recognizable ID (e.g., owner-given ID, or user-given ID), and future access permissions.

Figure 5:
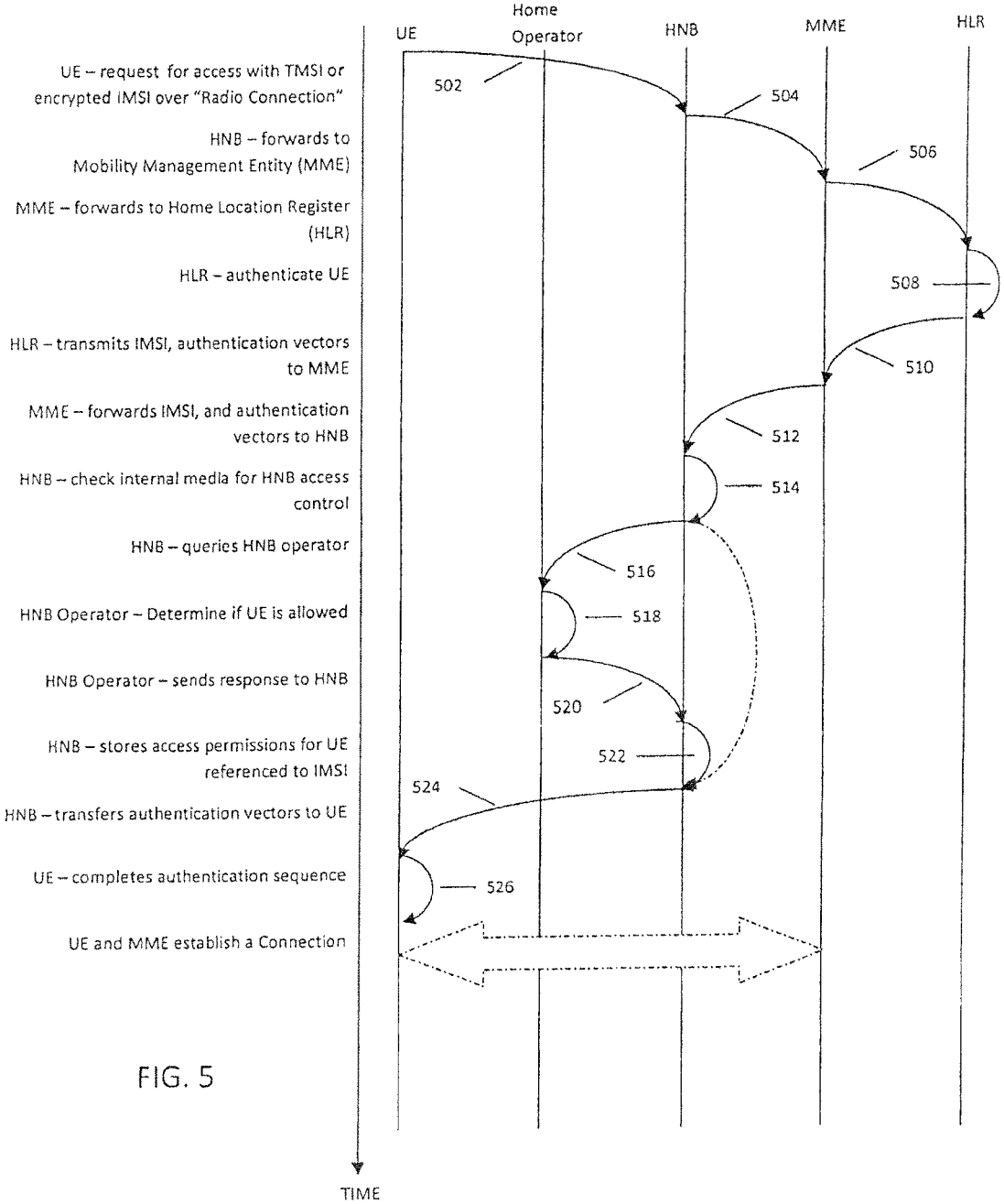
FIG. 5 is a graphical illustration of an exemplary message flow of an HNB access control procedure in accordance with one embodiment of the invention.

Referring now to FIG. 5, one embodiment of an HNB access control procedure in accordance with the principles of the present invention is described in detail. At step 502, the UE transmits the request for access comprising the TMSI, encrypted IMSI, and any additional connection messaging required. The message is forwarded to the Mobility Management Entity (MME) of the Core Network at step 504, which forwards the message to the Home Location Register (HLR) at step 506.

At step 508, the HLR authenticates the user, and generates an authentication vector. In one variant, this vector comprise a random number, an expected response (XRES), and an authentication token (AUTH). Other cryptographic approaches may be used as well, such as the inclusion of a hash or cryptographic residue.

At step 510, the authentication vector, and the unencrypted IMSI are sent to the MME, which forwards this message to the HNB (step 512).

At step 514, the HNB queries its internal database with the IMSI. The internal database contains an owner-given ID, and an access level, referenced to the IMSI. If the IMSI exists, then the HNB retrieves the access level, and skips to step 524. Further, if the HNB is set to a particular mode that does not require HNB operator input (e.g., open or closed mode), then the HNB skips to step 524 as well.

If HNB operator input is needed, at step 516 the HNB initiates an operator query. The operator query comprises for example a request for access level, and a request for a recognizable identifier. In one embodiment, a GUI format is used, and a user given ID is displayed, although other user interface approaches may be used as well.

At step 518, the HNB operator composes a reply, comprising for example an assigned access level, and a recognizable owner-given ID. In one embodiment, the owner has the option of generating a new owner-given ID, or accepting the user-given ID. The reply message is sent back to the HNB at step 520.

At step 522, the HNB stores the owner response to an internal storage device or media, such as for example a hard disk drive (HDD) or flash memory.

At step 524, the HNB transfers one or more authentication vectors to the UE if access is allowed. If access is denied, then authentication vectors are not transmitted. An optional error or denial (e.g., "access not granted") message may be composed and sent to the requesting UE as well.

At step 526, the UE completes the authentication sequence, and a connection between the UE and MME is established.

HNB Example Case—

In one exemplary illustration of the methods and apparatus for implementing the present invention, an LTE system is considered that supports one or more HNBs. For instance, a hypothetical doctor's office is equipped with such an HNB, and the doctor is the owner and operator of the HNB. He has already added himself and all his employees as users to the HNB. The IMSI of each user is stored internally in the HNB, together with the owner-given user ID (e.g., the real names of the doctor's employees). All accredited users are stored in an "allowed users" list. A "rejected users" list is empty. The HNB is set to a "closed" mode. Every unknown user is rejected without the doctor's intervention.

The doctor then employs a new trainee and wants to enable the trainee to use his HNB. The doctor switches the HNB to "normal" mode, and asks the trainee to connect to the HNB. A normal network authentication process is performed as was illustrated in FIG. 5; i.e., it is assumed that the UE of the trainee sends its TMSI in the authentication request message (step 502) to the network; the HLR identifies the user at step 508, and sends the authentication vector and the IMSI of the user to the HNB, and the HNB asks the owner whether he wants to add a new unknown user (step 516). The doctor affirms the desire to add the new user, and enters the trainee's real name, which becomes the owner-given ID for the trainee. The trainee is now stored as a known user with his owner-given ID and his IMSI in the "allowed users" list of the HNB at step 522. The doctor sets the HNB back to "closed" mode (or the HNB reverts to this mode after each such entry).

After a period of practical training has been completed, the doctor opens a GUI window showing the "allowed users" list of his HNB. He sees only the owner-given IDs (i.e., first name, last name), and not the corresponding IMSI. He then deletes the trainee from the "allowed users" list by way of the trainee's owner-given ID.

In the aforementioned example, the user is unidentified until the owner assigns a recognizable identifier. For certain instances, a text or image representation of the user may provide additional clarification for the HNB operator. In one such embodiment, when the HLR-like entity identifies the user at step 508, it may send the authentication vector, a text or image representation of the user, and the IMSI of the user to the HNB. In an alternate embodiment, textual information (e.g., SSN, address, etc.) and/or an image representation of the user is sent in plaintext (not secure) to the HNB, directly from the UE. The additional text or image representation is generated by the UE user, prior to attempting access to the HNB. This user-given ID is displayed in step 516 by the HNB. When the HNB operator sees the user-given ID, the HNB operator can more easily verify that the unauthenticated user is an expected UE. Thereafter, the owner is prompted for a new owner-given ID, where the user given ID is a suggested default. The doctor affirms the desire to add the new user, and does not change the user's suggested ID. The HNB stores the user-given ID, as the owner-given ID, and the corresponding access level, referenced to the user's IMSI.

Interworking WLAN—

The primary differences between iWLAN authentication and UMTS authentication relate to transport technology (as previously mentioned, access-independent NGN technologies separate transport technology from Core Network services). Due to the stand-alone functionality of WLAN Access Points, the WLAN UE and WLAN Access Point fully negotiate channel structure and transport resource allocation.

An additional structure, the Wireless Access Gateway (WAG), is defined for iWLAN operation. The iWLAN may host traffic which is not intended for 3G Packet Switched (PS) Services. The WAG implements policy enforcement and routing enforcement policies. Policy enforcement ensures that packets coming from or going to the iWLAN are allowed based on encrypted data within the packets (e.g., source and destination IP address and port number). Routing Enforcement ensures that all packets sent to and from the iWLAN UE for 3G PS-based service are routed to the home or roaming Public Land Mobile Network (PLMN).

Figure 6:
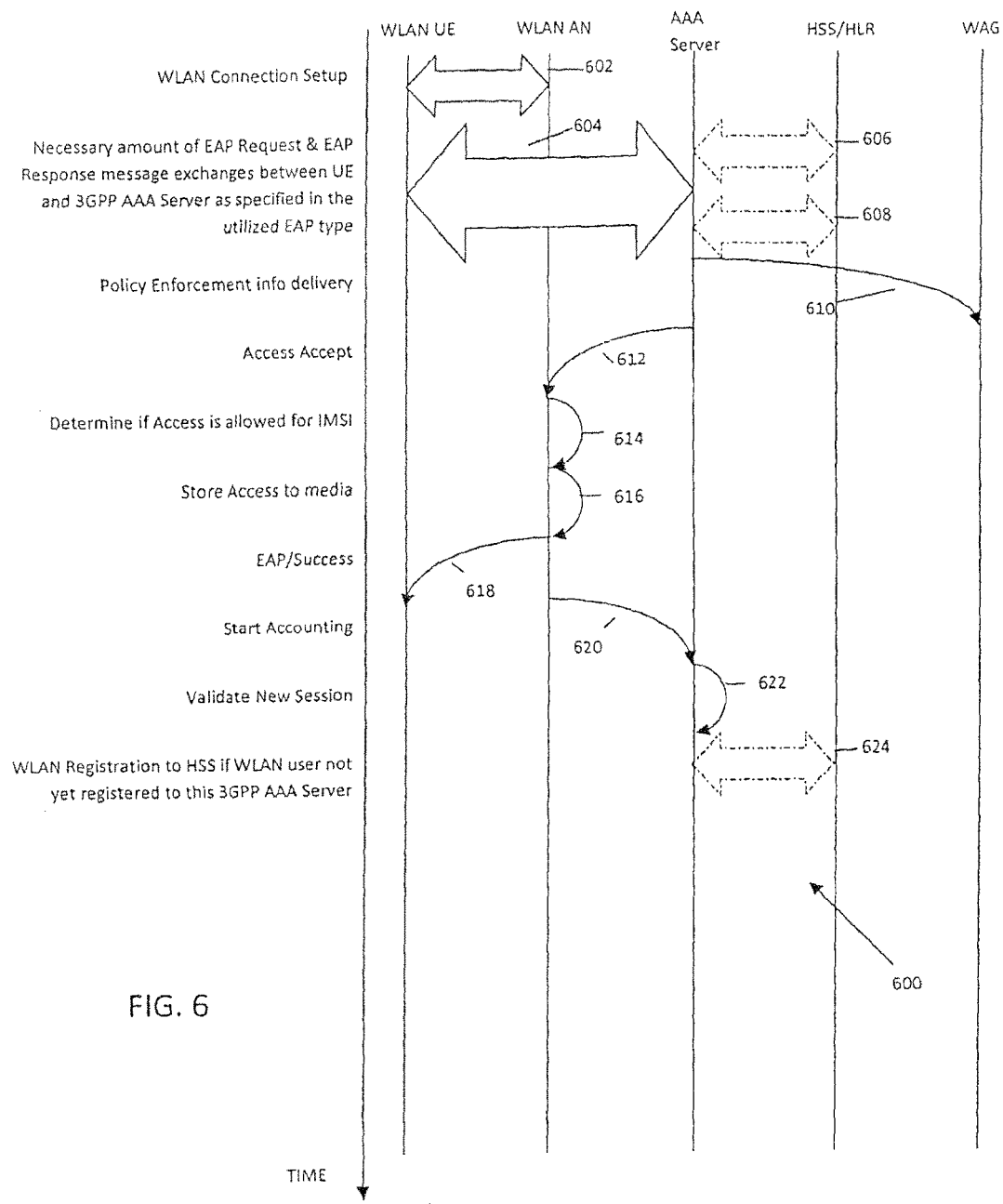
FIG. 6 is a graphical illustration of an exemplary message flow of an iWLAN authentication and authorization procedure in accordance with one embodiment of the invention.

Referring now to FIG. 6, one embodiment of an iWLAN authentication procedure in accordance with the principles of the present invention is illustrated. At step 602, a WLAN connection is established, and at step 604 an iWLAN authentication procedure (e.g. Extensible Authentication Protocol (EAP) or other such authentication process) is initiated, as specified by Release 6 (WLAN/3GPP interworking), which is incorporated herein by reference in its entirety. In this embodiment, all authentication packets are transported over the WLAN interface. The EAP protocol specifies a plurality of EAP Request and EAP Response message exchanges, which are executed between a 3GPP Authentication Server (AAA) and the iWLAN UE. Information stored in and retrieved from a Home Subscriber Server (HSS) may be needed to execute certain EAP message exchanges. If the necessary user information to execute the EAP authentication is not already available (i.e., recently stored) in the 3GPP AAA Server, the 3GPP Server initiates steps 606 and 608.

Specifically, at steps 606 and 608, the 3GPP AAA Server retrieves any required information not previously stored, from the HSS. At step 606, authentication information required by the 3GPP AAA Server is retrieved from the HSS/HLR. At step 608, the subscriber profile information is retrieved from the HSS if the information is not already at the 3GPP AAA Server. The Home Subscriber Server (HSS) for 3G networks is functionally similar to the Home Location Register (HLR) for 2G and 2.5G networks. The HSS includes modifications to enable additional IMS functionality. Retrieval of authentication and subscription data is accomplished using the username portion of the provided Network Access Identifier (NAI). The username portion of the NAI is an IMSI, or TMSI derived identifier generated at the 3GPP AAA Server.

Optionally, at step 610, the 3GPP AAA Server (or the 3GPP AAA Proxy in a roaming case) may send policy enforcement information to the WAG in the PLMN that the iWLAN UE has selected.

At step 612, if the authentication succeeds, the network authentication server (e.g., AAA) sends an EAP Access Accept message to the iWLAN AN. This message comprises additional information (such as security context, QoS and connection authorization information). For the described access control method, this message also carries the network user ID (IMSI). At step 614, the iWLAN access control entity uses the network user ID to determine if the UE has been allowed or rejected in the past. If the IMSI is not found, then the owner is asked whether to permit or deny access to this user. In the case that the UE is permitted, an owner-defined user ID is entered and stored with the network ID. At step 616, the network user ID is stored to the "allowed" list, and the iWLAN AN messages the iWLAN UE with an EAP "success" message at step 618. In the case that the UE is rejected, the iWLAN stores the network user ID to the "rejected" listing, and sends an EAP "failure" message to the iWLAN UE.

The remaining methodology for iWLAN operation is well known to one of ordinary skill in the art, and accordingly is only summarized herein. Specifically, at step 620, the 3GPP AAA server initializes accounting processes. At step 622, the AAA server validates the current session. If there is a different previously established authentication session of the WLAN user—e.g., a session that uses a different WLAN UE or roaming in a different WLAN AN or in a different VPLMN—the 3GPP AAA Server closes the previously established session to avoid multiple WLAN direct IP access sessions. Lastly, in step 624, the 3GPP AAA Server registers the WLAN users 3GPP AAA Server to the HSS. In registration messages, the subscriber is identified by its permanent identity (IMSI). This registration is needed only if the subscriber was not previously registered to this 3GPP AAA Server.

iWLAN Exemplary Case—

In one example usage scenario for the aforementioned iWLAN authentication procedure, an LTE system is considered supporting Interworking WLAN hotspots in a hypothetical sports club. The sports club is equipped with iWLAN access points. Only members of the sports club are permitted to access these services, and the sports club acts as the owner of the access technology. The sports club has added all members as users to the iWLAN system. The IMSI of each user is stored internally in the iWLAN system together with the owner given user ID (e.g., customer reference numbers). All accredited users are stored in the "allowed users" list. The "rejected users" list is empty. The iWLAN system is set to "closed" mode. Every unknown user is rejected without owner's intervention. Every authorized club user equipped with a WLAN network adaptor can connect to the iWLAN system.

Special Case: E911 Call—

In the previous Interworking LAN example, there are other means to perform access control. Specifically, as disclosed at step 610, policy enforcement is accomplished in this embodiment using the mechanisms specified in Release 6; i.e., at the Wireless Access Gateway (WAG) using unencrypted data within data packets (source and destination IP address and port number). At step 610, the WLAN UE has not been authenticated nor given access control by the 3GPP AAA Server. Therefore, in the Release 6 Interworking WLAN call setup procedure, the WAG may opt to limit even the first hop (over the air) before the terminal is able to signal that it is establishing an emergency call.

It is conceivable that such a limiting access control scheme would be prohibited by law for semipublic usage. It could be desirable or even necessary to allow access under certain circumstances. As an example, it could be mandatory to permit a user who is blocked in a "closed" user group iWLAN area to establish an emergency call.

In yet another aspect, access may be provided on the basis of the service required. In one example, depending on national regulations and operator preferences, in the case of IMS Emergency Calls, the 3GPP AAA server may still send an Accept message (i.e., indicating success of authentication and authorization) even though authentication or authorization fails. In case the WLAN UE has indicated IMS Emergency Call within the procedure, the routing policy sent to the iWLAN system includes in one variant only those policies necessary to set up an IMS Emergency Call. Specifically, the network must not transmit the network user 1D (IMSI) to the iWLAN system, but grant access to the emergency services.

It will be recognized that the WAG in the foregoing embodiment must still be implemented in iWLAN. In current state of the art, an iWLAN system does not support a closed subscriber group that could be managed easily by an owner. On the other hand, legacy home WLAN access points that support closed subscriber groups have no interworking functions with the 3G (e.g. 3G services are not available, and 911 calls could be performed by registered users only). The present invention satisfies the need to implement an iWLAN (with the WAG) that also supports closed subscriber groups managed by the owner of the iWLAN access point. The list of linked user-given IDs and network IDs is an exemplary solution to this issue. Hence, the described access control mechanism is not limited to HNBs, but may be utilized with other interworking radio access technologies like iWLAN, WIMAX, etc.

Apparatus—

Figure 7:
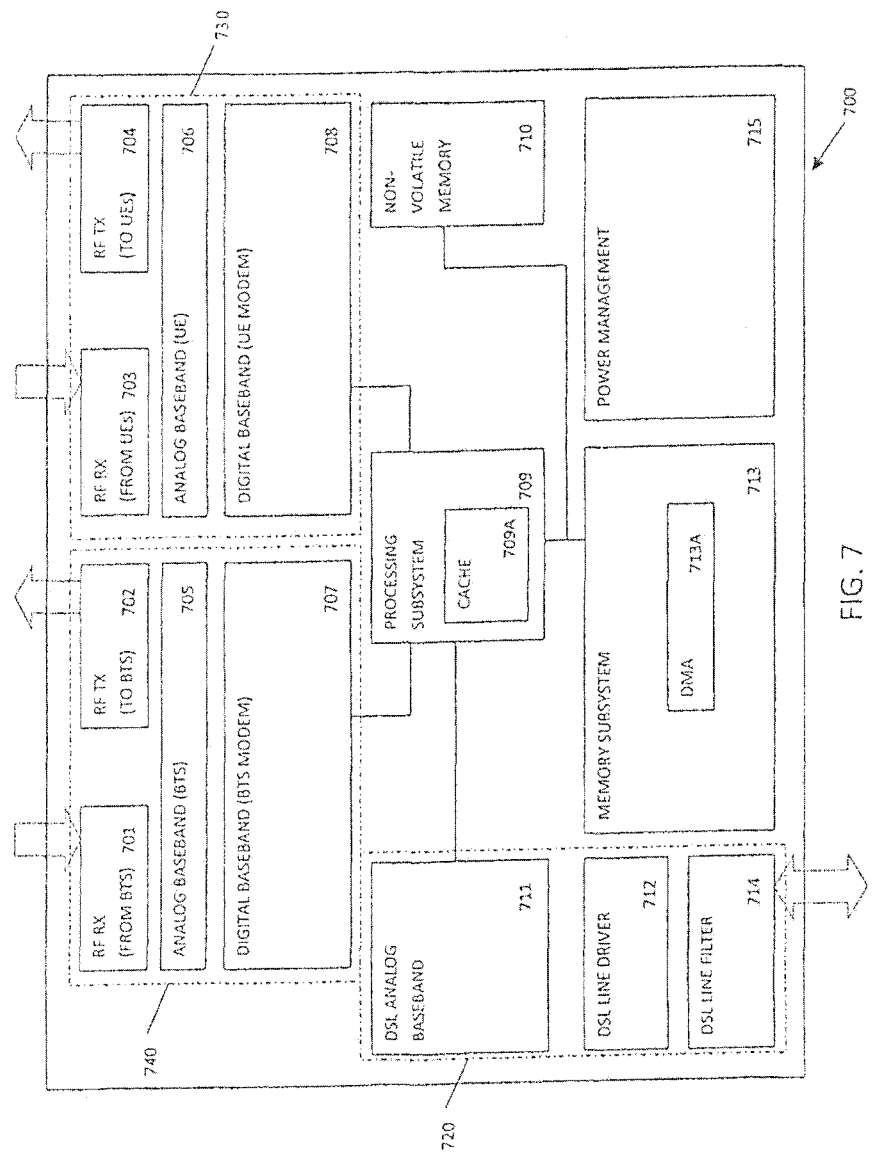
FIG. 7 is a block diagram illustrating one embodiment of an apparatus (here, an HNB for use in a cellular network) implementing the aforementioned methodologies of the invention.

Referring now to FIG. 7, exemplary apparatus 700 useful in implementing the methodologies of the present invention is illustrated. The apparatus 700 may for instance comprise an HNB 101 (FIG. 1) or other apparatus present within e.g., a cellular or other wireless network infrastructure.

As shown in FIG. 7, the components within the apparatus 700 are powered via a power management subsystem 715. The apparatus 700 also comprises a processing subsystem 709 such as a integrated circuit digital signal processor (DSP), microprocessor, gate array (e.g., FPGA), or plurality of processing components such as a distributed or integrated multi-core array. The processing subsystem 709 may also comprise an internal cache memory 709A. The processing subsystem 709 will preferably be in data communication with a non-volatile memory 710, as well as a memory subsystem 713. The memory subsystem 713 will also advantageously implement one or a more of direct memory access (DMA) type hardware 713 so as to facilitate rapid data access to memory 713.

As previously discussed, a key consideration for implementing network access control is providing user identity security. Therefore, a typical Home eNodeB requires at least a minimum level of security requirements which are implemented in hardware or software of the processing subsystem 709. Similar requirements have to be fulfilled in other non-3GPP access technology devices, because sensitive network data (akin to IMSI) are stored in these devices and must not revealed, even to the owner/operator.

The exemplary apparatus 700 therefore preferably implements a secure microprocessor (SM) or similar device (not shown) akin to those utilized in cable settop boxes or other consumer electronics with conditional access systems, that is adapted to receive and physically secure sensitive data including encryption keys and IMSI data or the like. A broadband access subsystem 720 is also provided in order to communicate with the Core Network. In the illustrated embodiment, the broadband access subsystem 720 is implemented via a DSL or DOCSIS cable modem connection. Therefore, for the exemplary DSL case, a DSL analog Baseband 711, DSL line driver 712 and DSL line filter 714 are included. The digital portion of DSL processing may either be done in the processor 709, or in a separate DSL processor (not shown). In addition, while a DSL broadband connection is shown, it is appreciated that other forms of broadband access (e.g. the aforementioned cable modem, T1 line, ISDN line, or even wireless high-bandwidth link) may be readily implemented.

The apparatus 700 also preferably implements a secure connection (e.g. IPsec VPN tunnel or the like) between the access technology and the core network, in that the interposed link is not physically secure. In one embodiment, this is accomplished via the broadband access subsystem 720 (i.e. the DSL connection shown in FIG. 7). Due to the sensitive nature of the data being transferred between the apparatus 700 and the security network entity, mutual authentication must occur. Moreover, both confidentiality (e.g., encryption) and integrity (e.g., cryptographic hash or residue) protection are optionally employed so as to frustrate surreptitious viewing and modification of the message content, respectively via, e.g., "man-in-the-middle" or similar attacks well known in the network security arts.

A wireless modem subsystem 730 for communicating with UEs, comprises a Digital Baseband 408, Analog Baseband 706, and RF components for RX 403 and TX 404. It will be appreciated that in alternate embodiments, not all of the foregoing components may be present, and/or may be merged with other components. Furthermore, in some embodiments, multiple UE RF front-ends may exist to support multiple simultaneous UEs and/or a MIMO system, such as that contemplated in fourth-generation UMTS systems (LTE). Multiple heterogeneous air interfaces may be used within the device as well (e.g., GSM, 3GPP, 3GPP2, TDMA, etc.).

Optionally, a BTS Modem subsystem 740 is included for communications with the BTS, such as for example that disclosed in co-owned and co-pending U.S. patent application Ser. No. 12/156,101 filed May 28, 2008 and entitled "WIRELESS FEMTOCELL SETUP METHODS AND APPARATUS", which is incorporated herein by reference in its entirety. In one exemplary implementation, the BTS Modem subsystem comprises a Digital Baseband 707, Analog Baseband 705, and RF components for RX 701 and TX 702. In other embodiments, not all components may be present (such as RF TX 702), or may be merged with one another (such as RF RX 701 and RF TX 702).

Figure 8:
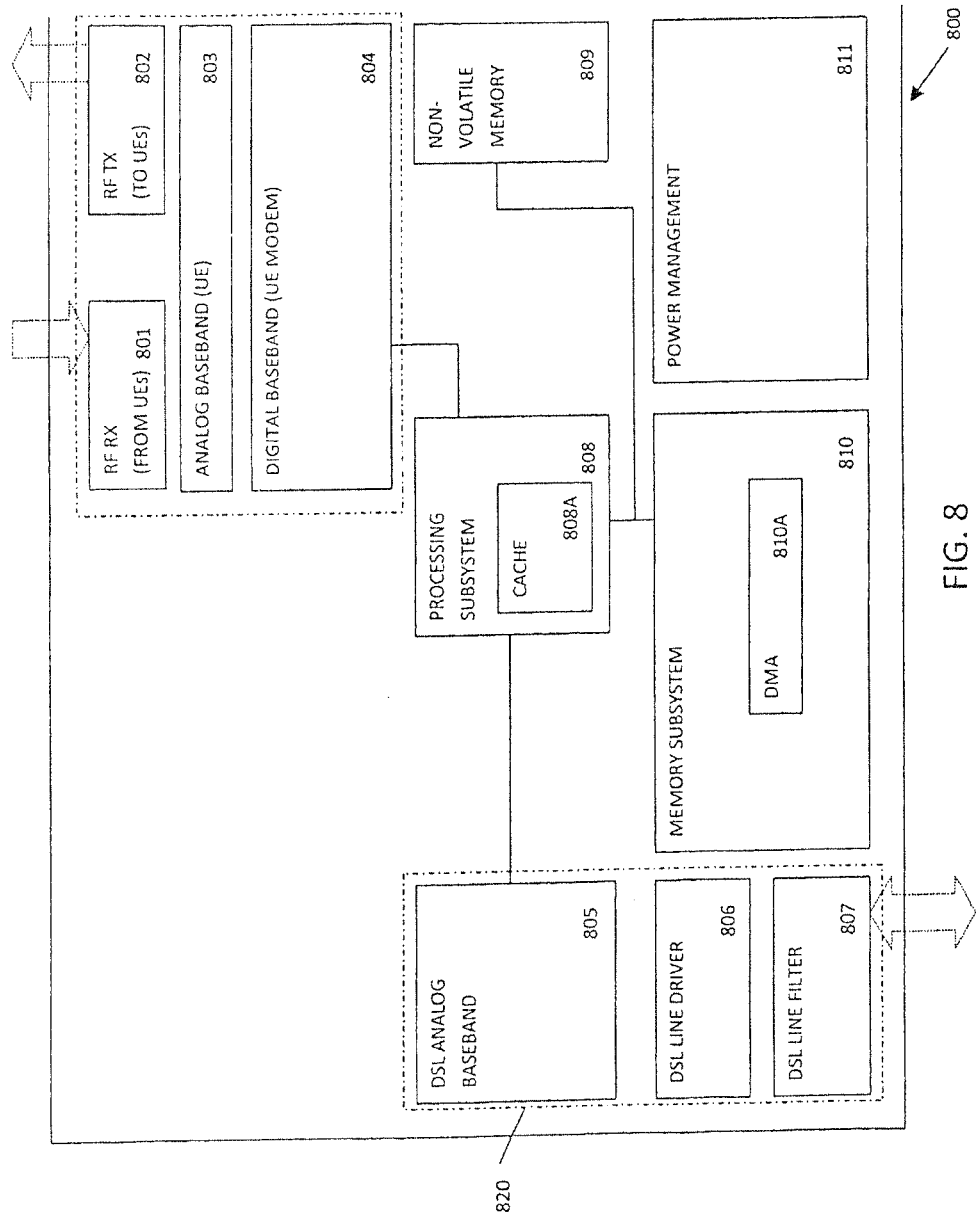
FIG. 8 is a block diagram illustrating another embodiment of the apparatus (iWLAN) implementing the aforementioned methodologies of the invention.

Referring now to FIG. 8, exemplary apparatus 800 useful in implementing the methodologies of the present invention for an iWLAN Access Point is illustrated.

As with the device 700 of FIG. 7, the components within the iWLAN apparatus 800 are powered via a power management subsystem 811. The apparatus 800 also comprises a processing subsystem 808 such as a digital signal processor (DSP), microprocessor, gate array (e.g., FPGA), or plurality of processing components such as a distributed or integrated multi-core array. The processing subsystem 808 may also comprise an internal cache memory 808A. The processing subsystem 808 will preferably be in data communication with a non-volatile memory 809, as well as a memory subsystem 810. The memory subsystem 810 will also advantageously implement one or a more of direct memory access (DMA) type hardware 810A so as to facilitate rapid data access to memory 810.

As previously discussed, a key consideration for implementing network access control is providing user identity security. Therefore a typical iWLAN Access Point requires at least a minimum level of security requirements which are implemented in hardware or software of the processing subsystem 808.

The exemplary apparatus 800 therefore may implement a secure microprocessor (SM) or similar device (not shown), similar to that of the apparatus of FIG. 7, that is adapted to receive and physically secure sensitive data including encryption keys and IMSI data or the like. A broadband access subsystem 820 is also provided in order to communicate with the Core Network. For the exemplary DSL case, a DSL analog Baseband 805, DSL line driver 806 and DSL line filter 807 are included. The digital portion of DSL processing may either be done in the processor 808, or in a separate DSL processor (not shown). In addition, while a DSL broadband connection is shown, it is appreciated that other forms of broadband access (e.g. the aforementioned cable modem, T1 line, or even wireless high-bandwidth link) may be readily implemented for the iWLAN device 800.

The apparatus 800 also preferably implements a secure connection (e.g. IPsec VPN tunnel or the like) between the access technology and the core network, in that the interposed link is not physically secure. In one embodiment, this is accomplished via the broadband access subsystem 820 (i.e., the DSL connection shown in FIG. 8). Due to the sensitive nature of the data being transferred between the apparatus 800 and the security network entity, mutual authentication must occur. As with the device of FIG. 7, both confidentiality (e.g., encryption) and integrity (e.g., cryptographic hash or residue) protection are optionally employed so as to frustrate surreptitious viewing and modification of the message content.

The UE modem subsystem 830 comprises a Digital Baseband 804, Analog Baseband 803, and RF components for RX 801 and TX 802. In some embodiments, not all components may be present, or may be merged with one another. Furthermore, in most embodiments, multiple UE RF front ends may exist to support multiple simultaneous UEs and/or a MIMO system, such as that contemplated in fourth-generation UMTS systems (LTE). Multiple heterogeneous air interfaces may be used within the device as well (e.g., GSM, 3GPP, 3GPP2, TDMA, etc.).

Business Methods and Rules Engine

It will be recognized that the foregoing network access control apparatus and methodologies may be readily adapted to various business models. For example, in one such model, a service provider/network operator may provide an access-controlled femtocell (such as the HNB 700 or iWLAN apparatus 800 described previously herein) to customers willing to pay a premium, or as an incentive for its higher-tier customers.

In another paradigm, certain strategic users could be selected to receive such femtocells based on inter alia their subscription level, rate of usage, geographic location, etc., even in exchange for consideration from the network operator (e.g., a rebate or reduction of their monthly service fees if they operate the femtocell in accordance with the network provider policies). These femtocells might also comprise network-controlled access control points, such that the selection of the aforementioned "open", "closed", or "query" modes is selected by the service provider (as opposed to the HNB or iWLAN AP owner). The residential or business "owner" would in effect lease or even utilize the device without charge in exchange for the service provider having control over one or more aspects of the operation of the node (such as via the interface between the HNB/iWLAN and the Core Network of the service provider).

The aforementioned network apparatus and methodologies may also be readily adapted for operation in accordance with an underlying business rules "engine". This business rules engine may comprise for example a software application and/or hardware, and is implemented in one embodiment as a separate entity at the Core Network, or alternatively within an existing entity residing at the Core Network or other network management process.

In one embodiment, the business rules engine takes into account the revenue and/or profit implications associated with providing access to known or unknown users via one or more user-operated femtocells. This may be done for any number of different reasons, such as e.g.: (i) so that resource allocation to the femtocell (see, e.g., co-owned and co-pending U.S. patent application Ser. No. 12/156,101 entitled "WIRELESS FEMTOCELL RADIO SETUP METHODS AND APPARATUS" now U.S. Pat. No. 8,144,725, previously incorporated herein, for exemplary femtocell resource allocation methods and apparatus) does not negatively impact network user experience, or the services that are able to be provided to users on the network via the geographically fixed base stations; (ii) to reserve resources for known users or service provider customers as opposed to unknown users, thereby at least ostensibly maximizing revenue for the service provider (especially in cases where resources are in contention); (iii) to protect against parasitic use, denial-of-service attacks, etc. by non-customers of the service provider.

Accordingly, the exemplary business rules engine can modify the behavior of the system at specific steps described in the methodologies above in order to accomplish one or more economic objectives for the network operator. These "business rules" may be imposed e.g., at time of resource request and then maintained for a period of time (or until an event triggering a re-evaluation occurs), or alternatively according to a periodic model. Myriad different schemes for implementing dynamic allocation of resources will be recognized by those of ordinary skill given the present disclosure.

Moreover, all or a portion of the foregoing analyses for business rules can be performed at the femtocell itself if so configured, such as via a client portion of distributed application (DA) in communication with a parent or "server" portion at the Core Network. In another aspect of the foregoing business methodologies, business and operational coordination between the cellular service provider and broadband service provider is contemplated. Specifically, the broadband interface (e.g., DSL, cable modem, etc.) service provider will typically be a separate entity than the cellular service provider (e.g., Verizon cellular versus Cox cable), although this is not always the case (e.g., Verizon cellular and Verizon DSL). In such cases where the two entities are distinct, cooperation between the entities for subscribers of both providers that will facilitate operation of the femtocell may be pre-arranged. For instance, the cable modem provider may tag or identify the subscriber having the femtocell as having higher priority than other users when resource (e.g., upstream or downstream bandwidth) contention situations arise, thereby not starving the femtocell of the ability to perform the previously described negotiation and communication with the core network. Alternatively or in addition, the femtocell subscriber's broadband interface may be given special privileges, such as enhanced security, QoS, "always on" status, etc. so as to facilitate operation of the femtocell. In exchange or consideration thereof, the wireless service provider may give that same subscriber (or even other subscribers of the cable company who are also subscribers of the wireless provider) certain preferences or incentives, such as free additional wireless "minutes" on their account, etc. This approach forms an incentive for prospective subscribers to use both the cellular and cable provider for their services, and act as a femtocell "node" for the cellular provider.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method, comprising:
   at a user equipment ("UE"):
   sending, by a transmitter of the UE to a femtocell, a first message including a temporary identification associated with the UE and a request by the UE to access a wireless network with which the femtocell is associated;
   receiving, by a receiver of the UE from the femtocell, a second message indicating permission has been granted to the UE to access the wireless network, wherein the permission to access the wireless network is based on input from an operator of the femtocell responding to the request, wherein the input includes a femtocell operator-assigned identity associated with the UE; and after the second message indicates that the UE is permitted to access the wireless network, establishing a connection with the wireless network via the femtocell, wherein the connection is established using an unencrypted unique International Mobile Subscriber Identity (IMSI) associated with the UE.

2. The method of claim 1, wherein the temporary identification is a Temporary Mobile Subscriber Identification (TMSI).

3. The method of claim 1, wherein the temporary identification is an encrypted IMSI.

4. The method of claim 1, wherein the wireless network is a Long Term Evolution (LTE) wireless network or an LTE-Advanced wireless network.

5. The method of claim 1, wherein the authentication vector is at least one of a random number, an expected response, an authentication token, a hash and cryptographic residue.

6. A user equipment ("UE"), comprising:
a receiver;
a transmitter; and
a processor coupled to the receiver and the transmitter, wherein the processor is configured to:
send, to a femtocell, a first message including a temporary identification associated with the UE and a request by the UE to access a wireless network with which the femtocell is associated;
receive, from the femtocell, a second message indicating permission has been granted to the UE to access the wireless network, wherein the permission to access the wireless network is based on input from an operator of the femtocell responding to the request, wherein the input includes a femtocell operator-assigned identity associated with the UE; and
after the second message indicates that the UE is permitted to access the wireless network, establish a connection with the wireless network via the femtocell, wherein the connection is established using an unencrypted unique International Mobile Subscriber Identity (IMSI) associated with the UE.

7. The UE of claim 6, wherein the temporary identification is a Temporary Mobile Subscriber Identification (TMSI).

8. The UE of claim 6, wherein the temporary identification is an encrypted IMSI.

9. The UE of claim 6, wherein the wireless network is a Long Term Evolution (LTE) wireless network or an LTE-Advanced wireless network.

10. The UE of claim 6, wherein the authentication vector is at least one of a random number, an expected response, an authentication token, a hash and cryptographic residue.

11. A processor comprising circuitry, wherein the processor is configured to:
generate, a first message to be sent to a femtocell where the first message includes a temporary identification associated with a user equipment (UE) including the processor and a request by the UE to access a wireless network with which the femtocell is associated;
receive, from the femtocell, a second message indicating permission has been granted to the UE to access the wireless network, wherein the permission to access the wireless network is based on input from an operator of the femtocell responding to the request, wherein the input includes a femtocell operator-assigned identity associated with the UE; and
after the second message indicates that the UE is permitted to access the wireless network, establish a connection with the wireless network via the femtocell, wherein the connection is established using an unencrypted unique International Mobile Subscriber Identity (IMSI) associated with the UE.

12. The processor of claim 11, wherein the temporary identification is a Temporary Mobile Subscriber Identification (TMSI).

13. The processor of claim 11, wherein the temporary identification is an encrypted IMSI.

14. The processor of claim 11, wherein the wireless network is a Long Term Evolution (LTE) wireless network or an LTE-Advanced wireless network.

* * * * *